(12) United States Patent
Klinghult et al.

(10) Patent No.: US 10,987,535 B2
(45) Date of Patent: Apr. 27, 2021

(54) DECIDING WEIGHT AND REPETITIONS IN A GYM MACHINE WITH NO MECHANICAL IMPACT

(71) Applicant: Sony Mobile Communications Inc., Tokyo (JP)

(72) Inventors: Gunnar Klinghult, Lund (SE); Johan Nyman, Lund (SE); Anders Linge, Lund (SE); Henrik Bengtsson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 48 days.

(21) Appl. No.: 16/067,852

(22) PCT Filed: Jan. 21, 2016

(86) PCT No.: PCT/IB2016/050302
§ 371 (c)(1),
(2) Date: Jul. 3, 2018

(87) PCT Pub. No.: WO2017/125787
PCT Pub. Date: Jul. 27, 2017

(65) Prior Publication Data
US 2019/0015694 A1 Jan. 17, 2019

(51) Int. Cl.
*A63B 24/00* (2006.01)
*H04B 5/00* (2006.01)
(Continued)

(52) U.S. Cl.
CPC ........ *A63B 21/063* (2015.10); *A63B 24/0062* (2013.01); *H04Q 9/00* (2013.01);
(Continued)

(58) Field of Classification Search
CPC . A63B 21/063; A63B 24/0062; A63B 5/0056; A63B 2071/065; A63B 2220/52;
(Continued)

(56) References Cited

U.S. PATENT DOCUMENTS 4,775,146 A * 10/1988 Stankovic .............. A63B 21/06
482/102
2003/0211916 A1 11/2003 Capuano
(Continued)

FOREIGN PATENT DOCUMENTS

FR 3004961 10/2014
WO WO 2008118173 10/2008
(Continued)

OTHER PUBLICATIONS

International Search Report and Written Opinion of PCT/IB2016/050302 dated Sep. 30, 2016, 12 pages.

*Primary Examiner* — Joshua Lee
*Assistant Examiner* — Shila Jalalzadeh Abyaneh
(74) *Attorney, Agent, or Firm* — Renner, Otto, Boisselle & Sklar, LLP

(57) ABSTRACT

A weight pin for use with a stacked weight exercise machine includes a handle portion, and a shaft portion extending outwardly from the handle portion. The shaft portion is configured to be removably positioned adjacent to one or more weights of the exercise machine to selectively engage the one or more weights during use of the exercise machine. The weight pin also includes interrogation circuitry arranged relative to the handle portion, the interrogation circuitry configured to read information from the adjacent one or more weights.

13 Claims, 6 Drawing Sheets

(51) Int. Cl.
*A63B 21/062* (2006.01)
*H04Q 9/00* (2006.01)
*A63B 71/06* (2006.01)

(52) U.S. Cl.
CPC ..... *A63B 2071/065* (2013.01); *A63B 2220/17* (2013.01); *A63B 2220/40* (2013.01); *A63B 2220/52* (2013.01); *A63B 2220/803* (2013.01); *A63B 2220/833* (2013.01); *A63B 2225/15* (2013.01); *A63B 2225/20* (2013.01); *A63B 2225/50* (2013.01); *A63B 2230/00* (2013.01); *A63B 2230/75* (2013.01); *H04B 5/0056* (2013.01); *H04Q 2209/47* (2013.01)

(58) Field of Classification Search
CPC .......... A63B 2230/00; A63B 2220/833; A63B 2220/17; A63B 2220/40; A63B 2220/803; A63B 2225/15; A63B 2225/20; A63B 2225/50; A63B 2230/75; H04Q 9/00; H04Q 2209/47; H04B 5/0056
See application file for complete search history.

(56) References Cited

U.S. PATENT DOCUMENTS

| | | |
|---|---|---|
| 2006/0094570 A1 | 5/2006 | Schneider |
| 2014/0235409 A1 | 8/2014 | Salmon et al. |
| 2015/0265903 A1 | 9/2015 | Kolen et al. |

FOREIGN PATENT DOCUMENTS

| | | | |
|---|---|---|---|
| WO | WO 2015113162 | 8/2015 | |
| WO | WO-2015113162 A1 * | 8/2015 | ........... A63B 21/075 |

* cited by examiner

DECIDING WEIGHT AND REPETITIONS IN A GYM MACHINE WITH NO MECHANICAL IMPACT

This application is a national phase of International Application No. PCT/IB2016/050302 filed Jan. 21, 2016 and published in the English language.

TECHNICAL FIELD OF THE INVENTION

The following disclosure relates generally to devices, systems and methods for receiving, recording and displaying information relating to physical exercise and, more particularly, to devices and systems for use with weight machines.

DESCRIPTION OF THE RELATED ART

In recent years, there has been a virtual explosion in the popularity of exercise and physical fitness due to the significant effect it can have on the quality of life. There are many popular forms of physical exercise including, for example, running, bicycling, and weight training. The growing interest in weight training is reflected by the growing number of gyms found in both public and private settings.

There are various types of weight training equipment. Typical weight machines, for example, use gravity as the primary source of resistance. A combination of simple machines (e.g., pulleys, levers, wheels, inclines, etc.) to change the mechanical advantage of the overall machine relative to the weight and convey the resistance to the person using the machine. Conventional stacked weight machines, such as those made by Cybex International, Inc. and Nautilus, Inc., typically include a stack of rectangular weight plates through which a vertical lifting bar passes. The lifting bar includes a plurality of holes configured to accept a pin. Each of the plates has a corresponding channel on its underside (or a hole through the middle) that aligns with one of the holes in the lifting bar when the lifting bar is in the lowered or at-rest position. To lift a selected number of the plates, the user inserts the pin through the channel and the corresponding hole in the lift bar at a selected weight level. As the user goes through the exercise motion, the lift bar rises and the pin supports all of the plates stacked above it. The various settings on the weight machine allow the user to select from several different levels of resistance over the same range of motion by simply inserting the pin into the lift bar at a desired weight level.

Conventional weight pins usually include a cylindrical shaft made of stainless steel or other hard metal. In its simplest form, a weight pin can be made from a single piece of cylindrical metal rod that is bent slightly at one end to form a handle for inserting and removing the pin into a weight stack. Other types of weight pins can include a plastic or metal handle portion that is attached to the cylindrical shaft which is inserted into the weight stack. The shaft can include spring-loaded ball bearings and/or other locking features to releasably engage the pin with the weight stack and prevent it from becoming dislodged during use of the weight machine. Some pins with locking features include a push button on the handle to facilitate engagement of the locking feature with the weight stack and/or lifting bar.

One important aspect of any type of exercise program is the ability to track personal performance and progress. For example, people engaged in endurance or distance forms of exercise (e.g., running, swimming, bicycling, etc.) often track the distance and/or time associated with a particular run, swim, ride, etc. Similarly, people using cardiovascular exercise machines (e.g., treadmills, stair-steppers, stationary bicycles, etc.) are often interested in knowing how long they exercise or how many calories they burn during a particular session.

One shortcoming of conventional weight machines, however, is that they lack a convenient way for the user to track and record his or her progress on a particular machine or group of machines during a particular exercise session or over a given period of time. As a result, people engaged in weight training programs often rely on memory to keep track of how many weights they lifted on a particular occasion, or how many repetitions they performed on a particular machine. Rather than rely on memory, some people use notebooks to manually record information about their workout. Neither of these approaches, however, is particularly convenient.

To address the above problem, some prior art weight machines incorporate a load cell or the like within a pin of the weight machine. As the user operates the machine, the load cell, based on known parameters of the machine, can calculate the weight that is lifted by the user. This information then can be stored for later retrieval and/or analysis.

A problem with using a load cell or similar device, however, is that it requires each machine be outfitted with the load cell pin, which can be costly. Further, the load cell may require periodic calibration to ensure accuracy, which further adds to the cost of the system.

SUMMARY

A system, device and method in accordance with the present disclosure overcome one or more problems found in the prior art. More particularly, a tag is attached to each liftable plate of the weight machine, and a weight pin for selecting the weight plates includes a reader for reading the tag. As the weight is selected by inserting the weight pin through a particular plate and into the lift bar, the tag is read by the reader and thus it can be determined the amount of weight that has been selected.

The weight pin may include a motion sensor, such as an accelerometer or the like, that can detect motion of the weight pin (and thus of the plates). As a user exercises on the machine, the movement information along with the selected weight can be stored in memory of the weight pin for retrieval at a later time. Alternatively, the data can be transferred to a server or other processing device in real time, where the data can be processed for retrieval and/or analysis by the user.

According to one aspect of the present disclosure, a weight pin for use with a stacked weight exercise machine includes: a handle portion; a shaft portion extending outwardly from the handle portion, wherein the shaft portion is configured to be removably positioned adjacent to one or more weights of the exercise machine to selectively engage the one or more weights during use of the exercise machine; and interrogation circuitry arranged relative to the handle portion, the interrogation circuitry configured to read information from the adjacent one or more weights.

Optionally, the interrogation circuitry comprises a near field communication device.

Optionally, the interrogation circuitry comprises a bar code reader.

Optionally, the weight pin can include an accelerometer configured to respond to movement of the one or more weights during use of the exercise machine.

Optionally, the interrogation circuitry comprises: a processor to process information read from the adjacent one or more weights; and memory operably connected to the processor to record information from the processor.

Optionally, the weight pin can include computer-readable instructions stored in the memory, the computer-readable instructions causing the processor to determine a number of repetitions associated with the use of the exercise machine based at least in part on the information received from the accelerometer.

Optionally, the memory includes computer-readable instructions that cause the processor to: determine rotational movement of the weight pin about an axis of the shaft portion based at least in part on the information received from the accelerometer; and determine a configuration of the exercise machine based on the rotational movement.

Optionally, the memory includes computer-readable instructions that cause the processor to determine an exercise weight associated with the use of the exercise machine based at least in part on the information received from the adjacent one or more weights.

Optionally, the interrogation circuitry further includes a transceiver for communicating information associated with at least one of the exercise machine or the data collected by the weight pin to another device.

According to another aspect of the present disclosure, an exercise system includes: a weight pin as described herein; a lifting bar; a plurality of stacked weights selectively engagable to the lifting bar via the weight pin; and a plurality of tags attached to respective ones of the plurality of weights, each tag of the plurality of tags including information unique to the respective weight.

Optionally, the tags comprise at least one of a nearfield communication tag or a bar code.

Optionally, the exercise system can include the exercise machine, wherein the exercise machine includes a support member movably extending through the one or more weights, wherein the support member includes at least one through-hole configured to receive the weight support portion of the device to releasably couple the one or more weights to the support member during use of the exercise machine.

Optionally, the exercise system can include a server communicatively couplable to the weight pin, wherein subsequent to reading information from the adjacent one or more weights the weight pin transmits the information to the server.

According to another aspect of the present disclosure, a method for obtaining information related to physical performance on one or more exercise machines, the method including using a weight pin for selecting a weight to be lifted to read information on the one or more weights during use of the exercise machine.

Optionally, the method can include: removably positioning at least a portion of a weight pin adjacent to one or more weights of a selected exercise machine, and supporting at least a portion of the one or more weights with the weight pin during use of the exercise machine.

Optionally, removably positioning at least a portion of the weight pin includes removably inserting at least a portion of the weight pin beneath the one or more weights to releasably couple the one or more weights to a lifting portion of the selected exercise machine during use of the exercise machine.

Optionally, the method can include recording information related to an acceleration of the one or more weights during use of the exercise machine.

Optionally, the method can include downloading information from the weight pin after use of the exercise machine.

Optionally, the method can include detecting rotational movement of the weight pin, and determining a configuration of the exercise machine based on the detected rotation.

According to another aspect of the present disclosure, a method is provided for determining a configuration of an exercise machine having at least one handle reconfigurable between a first configuration that provides a resistance in a first direction and a second configuration that provides a resistance in a second direction different from the first direction, the method including: detecting an initial acceleration of the at least one handle; determining if the initial acceleration is in a first direction or a second direction; and concluding the machine is in the first configuration when the initial acceleration is in the first direction, and the machine is in the second configuration when the initial acceleration is in the second direction.

Optionally, detecting the initial acceleration includes using an accelerometer attached to the at least one handle to detect the initial acceleration.

Optionally, the method can include wirelessly communicating the detected initial acceleration to a weight pin of the exercise machine, and wherein the determining and concluding steps are performed by a processor of the weight pin.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

DETAILED DESCRIPTION OF EMBODIMENTS

Figure 1A:
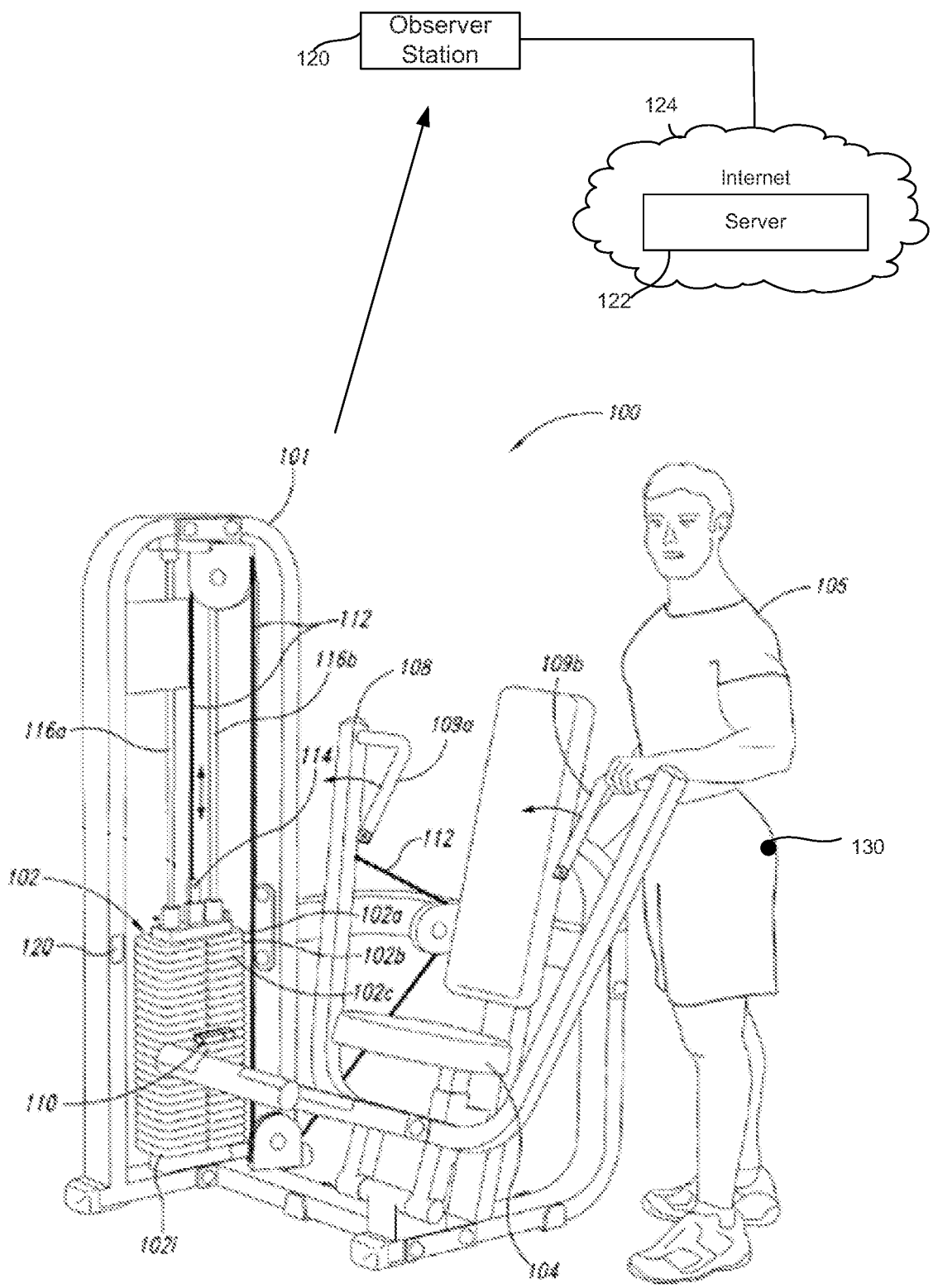
FIG. 1A is an isometric view of a suitable environment for use of a weight pin in accordance with the present disclosure.

Embodiments will now be described with reference to the drawings, wherein like reference numerals are used to refer to like elements throughout. To facilitate the discussion of any particular element, the most significant digit or digits of any reference number refer to the Figure in which that element is first introduced. For example, element 110 is first introduced and discussed with reference to FIG. 1.

It will be understood that the figures are not necessarily to scale. Also, features that are described and/or illustrated with respect to one embodiment may be used in the same way or in a similar way in one or more other embodiments and/or in combination with or instead of the features of the other embodiments.

The following disclosure describes various embodiments of devices, systems and methods for receiving, determining and/or recording information relating to the use of weight machines and other forms of physical exercise. In one embodiment, for example, a weight pin is provided for use in selecting a desired number of weights on a stacked weight exercise machine. In this embodiment, the weight pin can include one or more sensors for detecting various parameters associated with a particular exercise set. For example, the weight pin can include a tag reader or the like that can read tags attached to the weights of the machine. The weight pin can also include a motion sensor, such as an accelerometer or other sensor, for detecting motion of the weight stack in one or more directions.

As described in greater detail below, the weight pin can further include a microprocessor and associated memory. The microprocessor can execute computer-readable instructions to determine the amount of weight being lifted, the number of repetitions, and/or other useful information associated with a particular exercise set. This information can then be stored in pin memory and/or communicated to a server for further processing. After a particular workout session or series of sessions, the user can download the exercise data from the pin and/or server to a user computer, PDA, cell phone, or other display device to view the information, chart progress, estimate calories burned, etc. In this embodiment, the weight pin functions as a data acquisition device that can be used with one or more conventional stacked weight exercise machines without mechanical modification to the weight pin or the machines.

In a further embodiment, the weight pin can include a detachable data acquisition module that carries the microprocessor and memory discussed above. As described in greater detail below, the data acquisition module can store information about an exercise session or a series of sessions on a wide variety of weight machines. In one embodiment, the data acquisition module can be removed from the weight pin and connected to a personal computer or other signal-processing device (via, e.g., a USB port or other wired connection, a wireless connection, etc.).

As described in greater detail below, various embodiments of the invention can include computer-readable instructions that cause the personal computer or other display device to display the exercise information in various user-friendly formats. The formats can include, for example, various types of charts and graphs that illustrate the user's progress over time and provide other types of information relating to, e.g., workout duration, caloric burn rates, cardiovascular parameters, etc.

Although not required, aspects and embodiments of the present disclosure will be described in the general context of computer-executable instructions, such as routines executed by a general-purpose computer, e.g., a personal computer, PDA, etc. Those skilled in the relevant art will appreciate that aspects of the present disclosure can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. Aspects of the present disclosure can be embodied in a special purpose computer or data processor that is specifically programmed, configured or constructed to perform one or more of the computer-executable instructions explained in detail below. Indeed, the terms "computer," "processor," "microprocessor" and the like as used generally herein refer to any of the above devices, as well as any data processor.

The inventive aspects in accordance with the present disclosure can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the present disclosure described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that aspects of the present disclosure may reside on a server computer, while corresponding portions may reside on a client computer. Data structures and transmission of data particular to aspects of the present disclosure are also encompassed within the scope of the invention.

Certain details are set forth in the following description and in FIGS. 1-4 to provide a thorough understanding of various embodiments of the present disclosure. Other details describing well-known structures and systems often associated with weight training machines, signal processing systems, and electronic display devices, however, are not set forth in the following disclosure to avoid unnecessarily obscuring the description of various embodiments.

Many of the details, dimensions, and other features shown in the figures are merely illustrative of particular embodiments of the disclosure. Accordingly, other embodiments can have other details, dimensions, and features without departing from the spirit or scope of the present disclosure. In addition, further embodiments of the present disclosure can be practiced without several of the details described below.

FIG. 1A is an isometric view of an exercise system 100 configured in accordance with an embodiment of the present disclosure. The exercise system 100 includes a conventional stacked weight exercise machine 101 having a plurality of weights 102 (identified individually as weights 102a-102i), and a device 110 for receiving, determining and/or recording information related to use of an exercise machine 101.

Figure 1B:
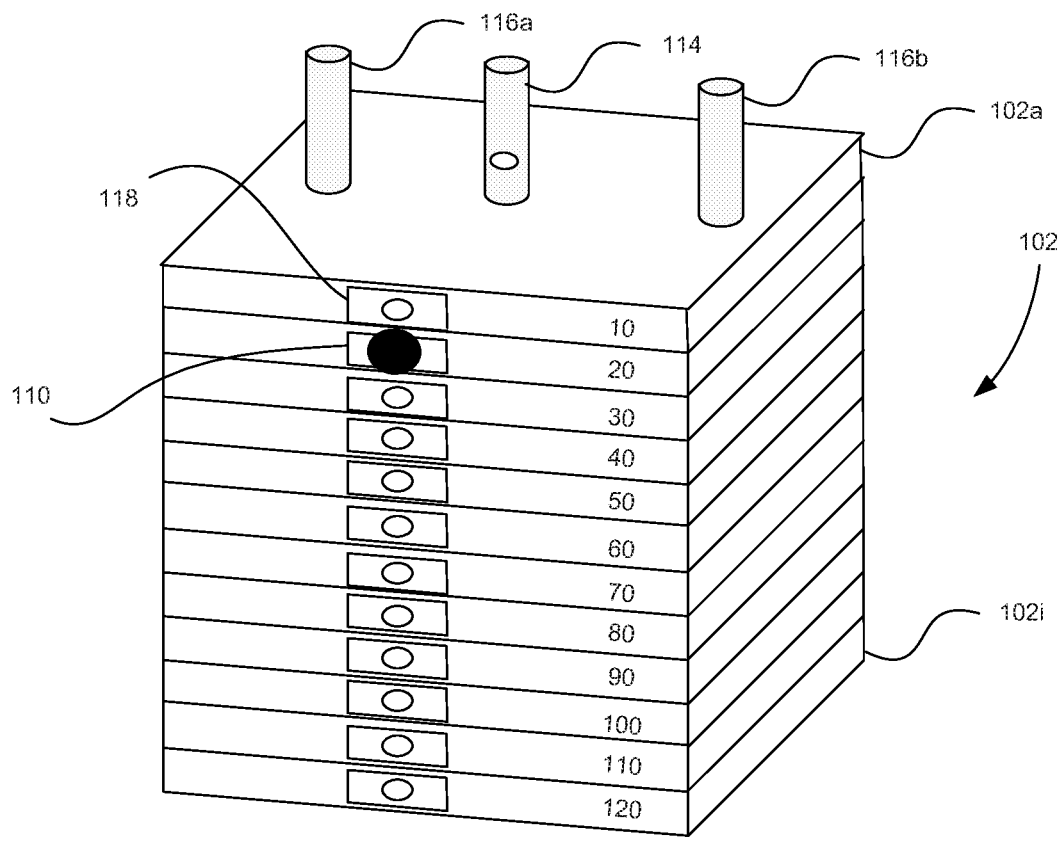
FIG. 1B is a detailed view of weight plates having an exemplary weight pin and tags in accordance with the present disclosure.

With additional reference to FIG. 1B, in the illustrated embodiment the device 110 is a weight pin having a tag reader, such as an NFC tag reader, bar code reader, or the like, that can read information of tags 118, such as active or passive NFC tags, bar codes or the like, that are affixable to the weights 102 of the exercise machine 101, each tag 118 being unique for the particular weight 102a-102i. A weight support member 114 is movably suspended from a cable 112 and hangs downward through the weight stack 102. The support member 114 includes a plurality of through-holes positioned adjacent to corresponding weights 102 when the support member 114 is in the relaxed or lowered position shown in FIG. 1A. The cable 112 attaches the support member 114 to a movable exercise bar 108 via a system of pulleys.

To use the exercise machine 101 with the weight pin 110 of the present disclosure, the user 106 switches the weight pin power "on" (or the weight pin automatically powers on upon detecting movement) and inserts the weight pin 110 through a hole or slot in the desired weight 102. The user 106 pushes the weight pin 110 through the slot until it passes through the adjacent hole in the support member 114. The user 106 then sits on a seat 104 and grasps a right handle 109a and a left handle 109b on the exercise bar 108. As the user 106 presses the bar 108 forward it rotates, pulling on the cable 112 and drawing the support member 114 upwardly. As the support member 114 moves upwardly, the weight pin 110 moves all of the weights 102 stacked above the weight pin 110 upwardly along parallel guide members 116a and 116b. When the user 106 relaxes his arms and allows his hands to move back toward his chest, the lifted weights 102 return downwardly to the stack.

As described in greater detail below, the tag reader of the weight pin 110 enables the pin 110 to acquire information about the exercise set (e.g., amount of weight lifted, etc.) and store this information in the weight pin 110 for later retrieval. Alternatively or in addition to, the weight pin 110 may communicate the collected information to a server 122 in real time. For example, the weight pin 110 may be in communication with an observer station 120 via a short range wireless connection, such as a Bluetooth® connection or the like. The observer station 120 may communicate the information received from the weight pin 110 to a server 122 via the internet 124 or via a wired connection (not shown), where the data can be stored on the server 122 for further processing.

After the user 106 is done working out on the machine 101, he can extract the weight pin 110 from the weight stack 102 and insert it into a weight stack on a different exercise machine prior to beginning his workout on that machine. In this manner, the user 106 is able to record information relating to his entire workout session with the weight pin 110, regardless of the particular weight machines he elects to use.

Alternatively, instead assigning a weight pin 110 to a specific user 106 (and thus requiring movement of the weight pin 110 from machine to machine), the user 106 may simply carry an identification tag 130, which may be in the form of a magnetic button, wrist band, or the like, and place or swipe the tag 130 on a designated location on the exercise machine 101. The tag 130 can include information specific to the user (e.g., name, age, weight, etc.). The designated location on the exercise machine 101 may include a reader 120 that can extract information from the user tag 130 and communicate the extracted information to the server 122 in the same/similar manner that the information is extracted from the weight pin 110 and communicated to the server 122. The server 122 then can assemble the information from the user tag with the information from the weight pin 110, for example, by correlating time stamps provided by user tag 130 and the weight pin 110 as described below.

Figure 2C:
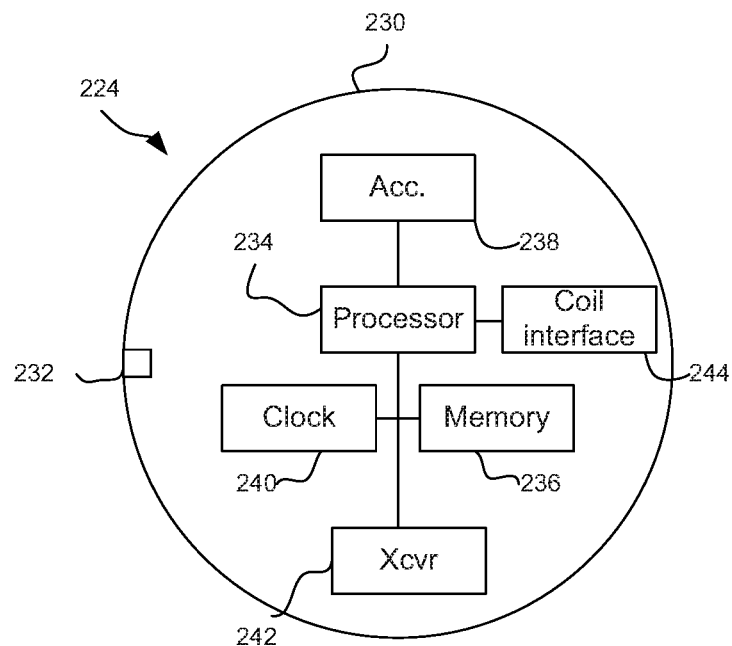
FIG. 2C is a schematic diagram of exemplary circuitry that may be employed in the weight pin in accordance with the present disclosure.
Figure 2A:
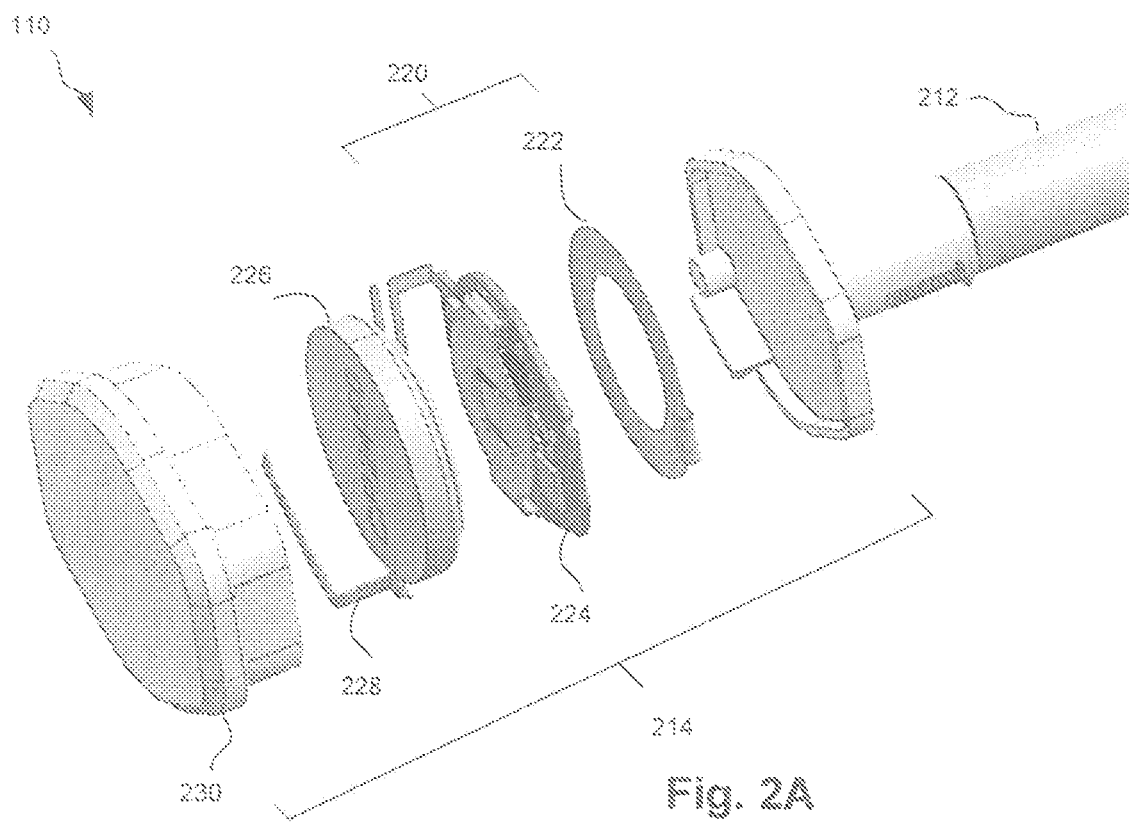
FIG. 2A is an exploded view of an exemplary weight pin in accordance with the present disclosure.

Moving to FIG. 2A, illustrated is an exploded isometric view of an exemplary weight pin 110 configured in accordance with an embodiment of the present disclosure. The weight pin 110 includes a shaft portion 212 extending outwardly from a handle portion 214. As discussed above with reference to FIG. 1A, the shaft portion 212 can serve as a weight support portion configured to extend through a weight stack on a conventional stacked weight exercise machine and engage a support member. In addition the shaft portion 212 can also include one or more retaining features (such as, for example, a first spring-loaded ball-bearing and a second spring-loaded ball-bearing—not shown) for releasably retaining the shaft portion 212 in a weight stack during an exercise set. The shaft portion 212 can be manufactured from a hard metal, such as stainless steel, and/or other suitable materials known in the art.

The handle portion 214 carries a sensor assembly 220, such as a Near Field Communication (NFC) device, that includes an antenna coil 222 and interrogation/reading circuitry 224 operatively coupled to the antenna coil 222. A battery 226 provides power to the sensor assembly 220 via electrical terminal 228, and a cover 230 may be arranged over the battery 226 and sensor assembly 220 to prevent user contact therewith. Although a NFC device is described, other devices, such as a bar code reader, may be employed to read tags 118.

Figure 2B:
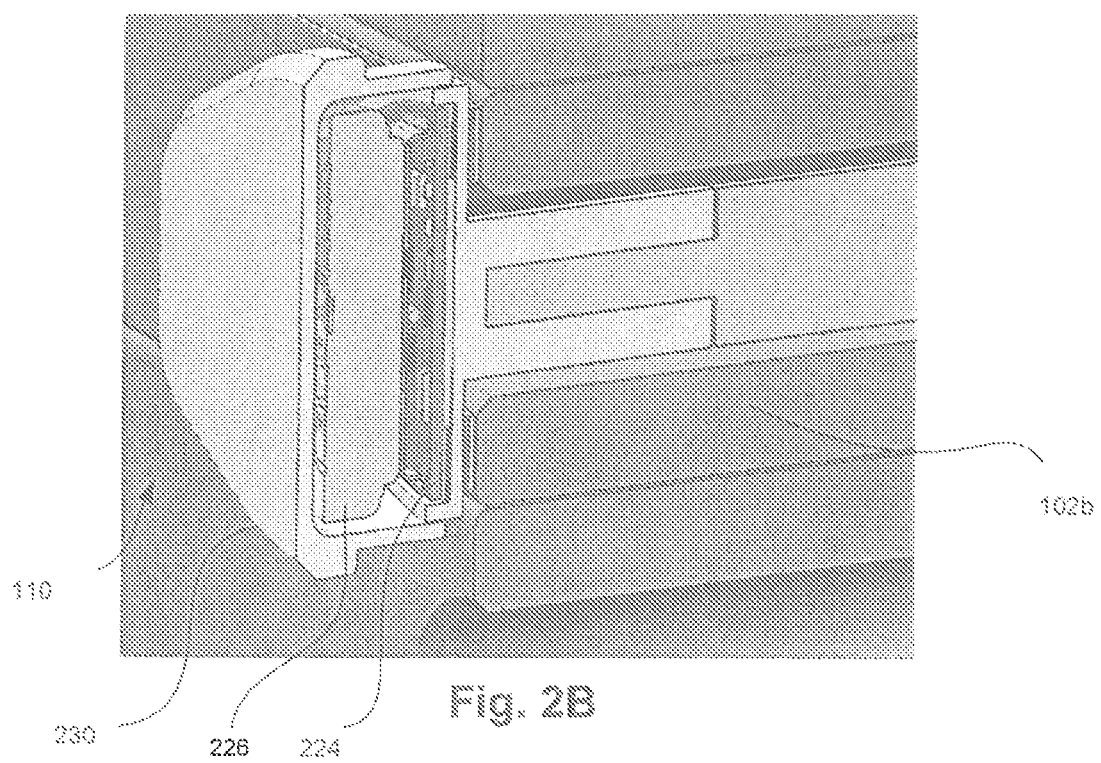
FIG. 2B is a cutaway isometric view of a weight pin in accordance with the present disclosure inserted into a weight machine.

Preferably, the antenna coil 222 has a circular form factor, although other form factors are contemplated. The antenna coil 222 is located on the weight pin 110 such that a distance from the antenna coil 222 to a coil of the tag 118 (described below) on a respective weight plate 102 is at a minimum when the weight pin 110 is inserted into the exercise machine 101. The weight pin 110 may include a magnet to draw the weight pin 110 (and thus the antenna coil 222) toward one of the weights 102 so as to ensure close proximity between the antenna coil 222 and the coil of the tag 118. FIG. 2B illustrates in cross-section the weight pin 110 in close proximity to a weight plate 102b of the stack of weights 102. Due to the short distance between the antenna coil 222 and the antenna of the tag 118, disturbance from adjacent tags of other weights 102 will be low and thus accurate readings can be obtained from the tag 118.

With additional reference to FIG. 2C, the reading circuitry 224 includes a plurality of electronic components carried on an electronic device substrate 230 (e.g., a printed circuit board, printed wire board, and/or other suitable substrate known in the art). A processor 234 (e.g., a microprocessor) can be configured to execute computer-readable instructions stored on associated memory 236 (e.g., non-volatile memory). The processor 234 can also include its own memory (not shown) with computer-readable operating instructions. The circuitry 224 can also include an accelerometer 238 (e.g., a MEMS-type accelerometer or accelerometer employing other suitable technology) and a clock 240 (e.g., a quartz clock). As described in greater detail below, the accelerometer 238 can be used to detect motion of the weight pin 110 during an exercise set and provide this information to the processor 234 along with time data from the clock 240. The processor 234 can determine various performance parameters associated with a particular exercise set (e.g., selected weight, number of repetitions, duration, energy expended, etc.) based on the information received from the accelerometer 238, the tag 118, and the clock 240. These parameters can be stored in the memory 236 for later download to a personal computer or other display device, or transmitted to the server 122 for storage and additional processing.

Additionally, the accelerometer 238 can be used to generate an interrupt when movement of the weight pin 110 is detected. Such movement can include, for example, movement due to the weight pin 110 moving up/down as the weights 102 are moved during an exercise routine, as well as movement of the weight pin 110 due to insertion/removal of the pin 110 from the machine 101. The interrupt can be used to turn portions of the circuitry 224 on or off, there by conserving power (e.g., as an alternative to manually turning the circuitry on/off). Alternatively, the circuitry 224 can include a power on/off switch 232 operably connected to a microprocessor 234 to enable the user to turn the circuitry on/off.

The circuitry 224 can additionally include a transceiver 242 for transmitting and receiving radio-frequency (RF) or other wireless signals. The wireless transceiver may employ, for example, one or more of Bluetooth, Bluetooth low energy (BLE) or WiFi technology. In one embodiment, for example, the transceiver 242 can include an RF transceiver with an associated scanning antenna (not shown) that broadcasts short-range RF signals. In this embodiment, the observer station 120 can include an RF transceiver to enable two-way communication therebetween. The circuitry 224 of the weight pin 110 can transmit information stored in memory (e.g., machine type, machine settings, etc.) back to the scanning antenna on the transceiver 242. The machine information can be stored in the memory 236 and associated with the performance data (e.g., selected weight, number of repetitions, elapsed time, etc.) for the exercise set. In other embodiments, the transceiver 242 can include other types of data transmitters/receivers for transmitting/receiving information about exercise machines and/or other information. Such transmitters/receivers can include both wired and wireless (e.g., RF, cellular, satellite, microwave, infrared, etc.) devices.

The processor 234 is also coupled to a coil interface 244 so as to enable the processor to send and receive data wirelessly, e.g., via the antenna coil 222. In particular, the circuitry 224 is configured to transmit electromagnetic energy via the antenna coil 222 to interrogate a tag 118 corresponding to one weight plate of the weight stack and in response to the interrogation, the tag 118 provides the requested information. As is known in the art, NFC is an extension of the RFID standard, operates at 13.56 MHz, and is limited to communication at close proximity, typically 5 cm or less. Data collected from the tag 118 and movement data determined via the accelerometer 238 are associated to one another and provided with a time stamp, the time being provided by the clock 240. The associated data then can be stored in memory 236 of the weight pin 110 for later retrieval and/or transmitted via the transceiver 242 to server 122 via the observer station 120.

As an alternative to the NFC device, the weight pin 101 may include a bar code reader and the tags 118 may include bar codes. The bar code reader may be any conventional bar code reader known in the art. In use, as the weight pin 110 is inserted into the weight machine 101, the handle portion of the weight pin 110 is adjacent to the weight (and thus the tag 118). The bar code reader then can read the bar code attached to the weight 102 and deduce the selected weight along with any other information on the bar code.

Figure 3A:
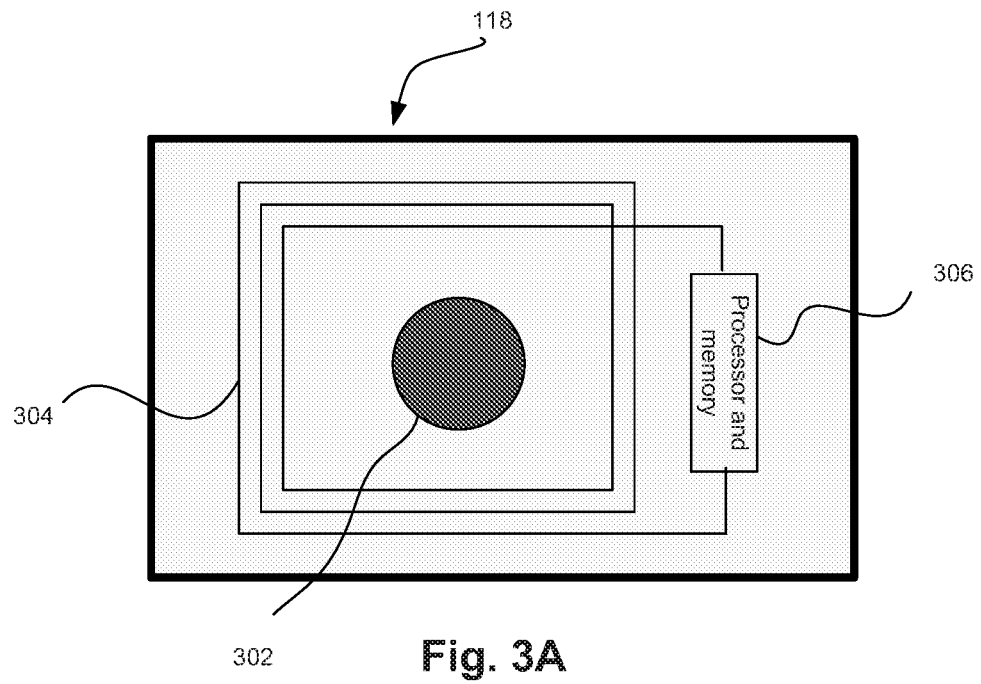
FIG. 3A is a top schematic view of an exemplary tag that may be used in accordance with the present disclosure.

Moving now to FIG. 3A, illustrated is a schematic diagram of an exemplary tag 118 that may be used for determining selected weights in accordance with the present disclosure. The tag 118 may be affixed to each weight 102 via an adhesive or fastener (e.g., a screw or the like), and may be formed from plastic or other material. The tag 118 may be a passive device (i.e., it does not have its own power source and is powered by electromagnetic energy transmitted from sensor assembly 220) or an active device (i.e., it has its own power source, such as a battery). The embodiment illustrated in FIG. 3A illustrates a rectangular form factor, although other form factors are contemplated, e.g., a circular form factor. The tag preferably includes an aperture 302 that corresponds to the hole in each weight 102.

The tag 118 includes a conventional antenna coil 304 for receiving electromagnetic energy from the weight pin 110 and for communicating data to the weight pin 110. Circuitry 306 is electrically coupled to the antenna coil 304 to receive power therefrom and to communicate data to the weight pin 110. The circuitry 306 may include a memory for storing information concerning the weight plate to which the tag is associated.

Figure 3B:
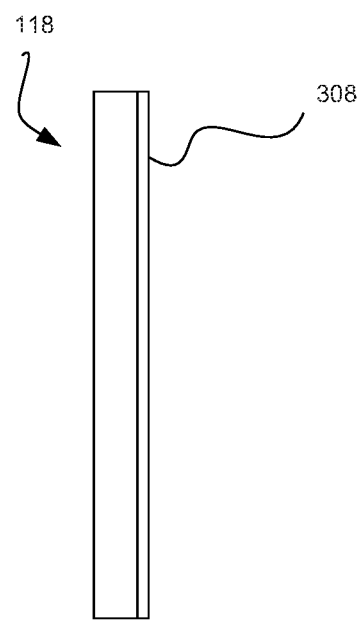
FIG. 3B is a side view of the tag of FIG. 3A.
Figure 4:
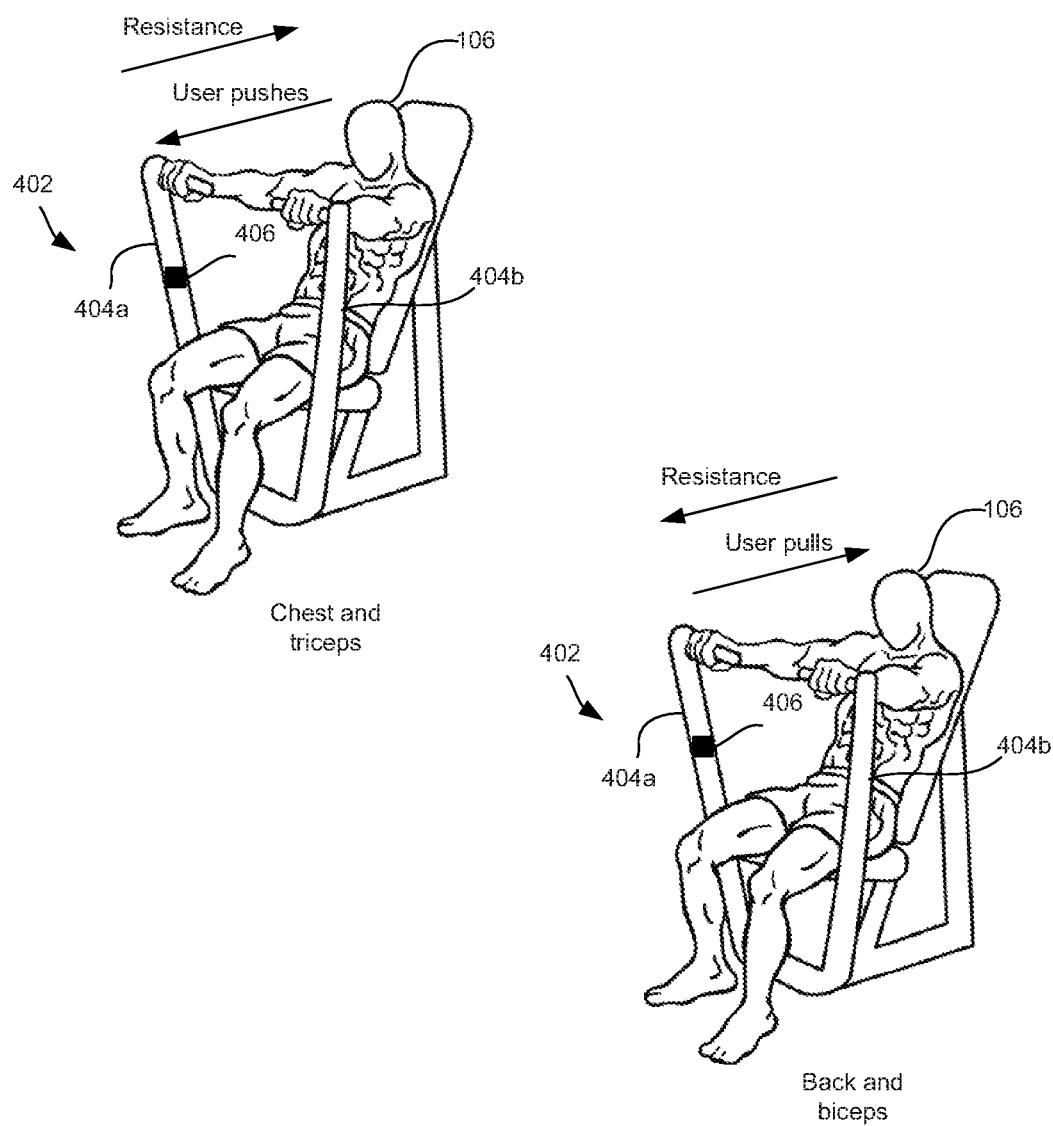
FIG. 4 is an isometric view of another exercise machine to which the weight pine in accordance with the present disclosure may be applied.

Since the weights 102 are typically formed from iron, they can affect the transmission quality of NFC devices. To minimize interference, in one embodiment a spacer 308 may be located between the coil 304 and the iron weight 102 when the tag 118 is affixed to the weight 102 as shown in FIG. 3B. The spacer 308, which may be formed from plastic or like material, creates a separation distance, for example 1-2 mm, between the antenna coil 304 and the iron weight 102 that helps to minimize interference from the iron weight. In another embodiment, the spacer 308 includes or is formed from a ferrite film, which can act as an electromagnetic barrier that isolates the iron weight from the tag and antenna 304, thereby minimizing interference from the iron weights.

Each tag 118 includes a unique identifier that can be used to identify a respective one of the weights 102. For example, in the embodiment illustrated in FIG. 3A the identifier may be stored in memory of the circuitry 306. In another embodiment, the identifier may be stored as one or more bar codes or the like. The unique identifier may be a serial number that can be used to determine the unique weight at which the tag 118 is located and on which exercise machine the unique weight stack it is located. Alternatively or additionally, the unique identifier may include a machine identifier corresponding to the particular exercise machine and a weight indicating the total weight that would be lifted if the weight 102 is selected. Programming of each tag 118 may be done during the assembly process using a built in programmer in the mounting fixture, or can be done at the installation, for example, using a mobile device.

In some exercise machines there may be multiple weight pins for selecting a desired weight. In such machines, the information from each weight pin can be transmitted to the server 122 and used to deduce the selected weight.

Some weight machines have multiple training schemes. For example, and with reference to FIG. 4, a multi-purpose machine 402 may be used to work different muscles (e.g., the chest muscles and the back muscles). Since multiple types of exercises can be performed, a problem arises in that the system does not know which exercise is being performed.

In accordance with another aspect of the present disclosure, to identify to the system which exercise is being performed the user 106 can simply turn the weight pin 110 in one direction or the other to signify the exercise being performed. For example, if the user 106 is performing a first exercise for a first muscle group (e.g., the chest muscles), the user 106 can insert the weight pin 110 into the support member 114 (not shown in FIG. 4) and then rotate the pin 110 to the left. If the user 106 is performing a second exercise for a second muscle group (e.g., the back muscles), the user 106 can insert the weight pin 110 into the support member 114 and then rotate the pin 110 to the right. In response to the rotation, the accelerometer generates data that can be used to determine which way the pin 110 is rotated. The detected rotation direction then can be used to determine the particular exercise being performed.

The rotation direction of the weight pin 110 can be combined with the degree of rotation to further identify other exercises being performed by the user. For example, a quarter right-turn can identify a first exercise, a half right-turn can identify a second exercise, a three-quarter right-turn can identify a third exercise, and so on. To assist the user 106 in determining the amount of rotation, the cover 228 of the weight pin 110 may include a marker device, e.g., an arrow.

To detect the rotation of the weight pin 110, in one embodiment the accelerometer 238 of the weight pin 110 is capable of detecting the static gravitation field (the accelerometer 238 can detect g-force in three axes, x, y and z). Thus, the accelerometer 238 can measure the inclination of the gravitational field, which can be used to determine the degree of rotation of the weight pin 110 using conventional techniques. The detected rotation and/or degree of rotation can be stored in memory 236 of the weight pin 110 along with the other collected data and/or transmitted to the server 122 for storage and/or further processing.

In another embodiment, motion sensing devices, such as accelerometers or other sensors, arranged on the handles of the machine may be used to detect the exercise being performed/configuration of the machine. More particularly, on some machines the left and right handles 404a, 404b of the machine can be reconfigured in order to perform different exercises routines (to change from a "pushing" motion to a "pulling" motion). For example, in a first configuration forward (pushing) movement of the handles 404a, 404b may raise the weights 102 and reverse movement of the handles 404a, 404b may lower the weights 102, while in a second (pulling) configuration reverse movement of the handles 404a, 404b may raise the weights 102 and forward movement of the handles 404a, 404b may lower the weights. Such reconfiguration is often performed by reorienting the position of the handles 404a, 404b relative to the lifting means (e.g., via pins—not shown).

To detect the specific exercise routine (e.g., pushing or pulling) being performed in a reconfigurable machine, the direction of the handles 404a, 404b can be monitored. In this regard, a motion sensing device 406, such as an accelerometer, can be placed on one or both of the handles 404a, 404b, the motion sensing device 406 including an accelerometer or other suitable sensor. The motion sensing device 406, which may be in the form of a dongle, may also include a processor, memory, transceiver and battery similar to the weight pin circuitry shown in FIG. 2C. In this embodiment the earth gravitational field is of no interest and thus the specific mounting of the dongle is non-critical.

In operation, as the user 106 pushes the handles 404a, 404b the motion of the handle(s) 404a, 404b is measured by the motion sensing device 406. As the handle(s) is/are initially moved while in the first "pushing" configuration, the motion sensing device 406 will provide motion data along with an indication of the direction of the motion (e.g., positive or negative sign indicating one of two directions). As the user 106 reaches the end of the stroke and brings the weight back down, the motion will change sign (e.g., negative or positive). Accordingly, the motion data will initially have a first sign (e.g., positive) and end with a second sign (e.g., negative). Now when the machine is reconfigured to the "pulling" configuration, the order of the sign will change. More particularly, the motion data will be opposite that in the first configuration, i.e., the motion data will initially have a negative sign, and finish with a positive sign. By analyzing the order of the positive/negative sign, it can be determined if the machine is in a pushing or pulling configuration. This information can be communicated to the weight pin 110 and/or server 122.

Figure 5:
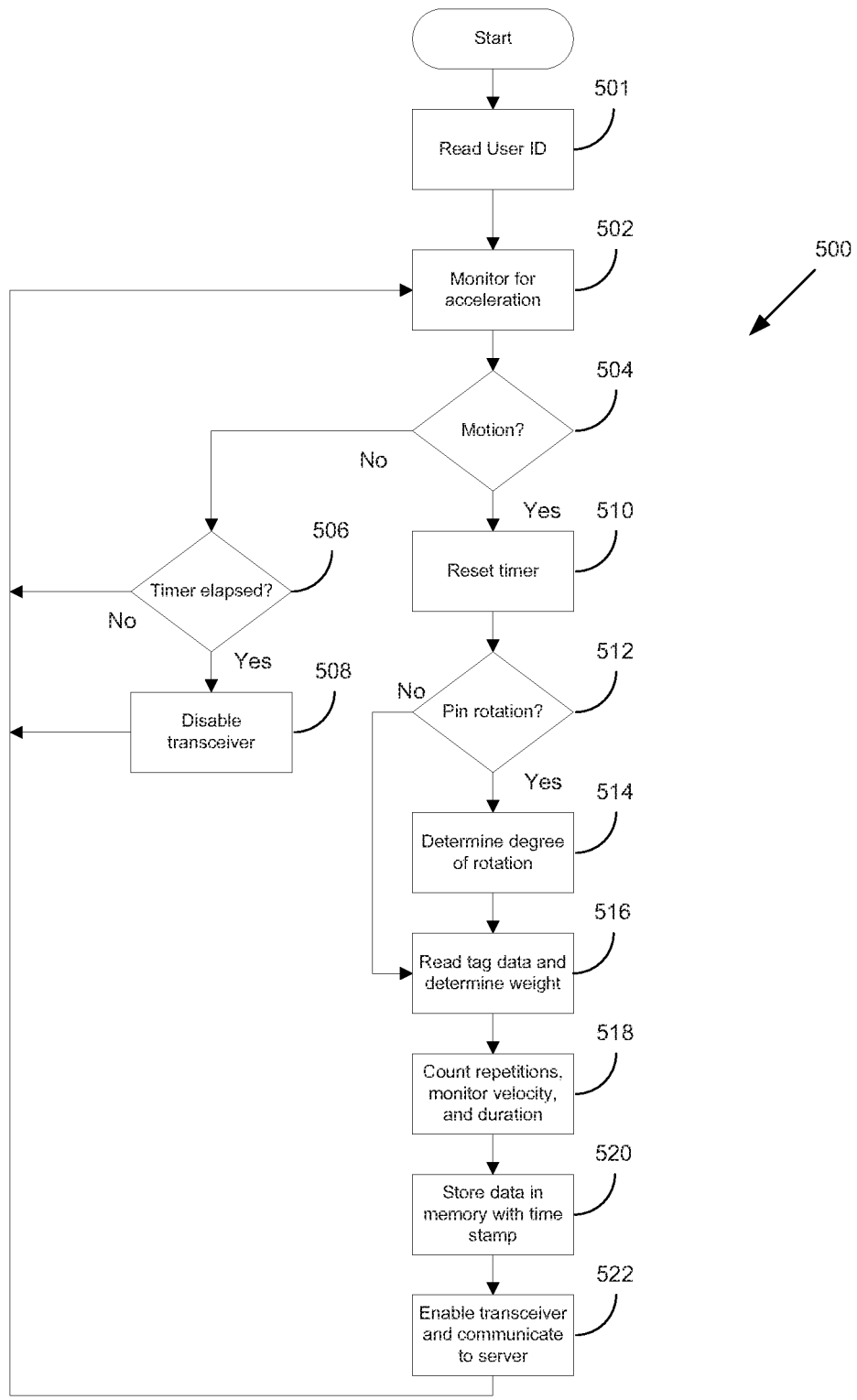
FIG. 5 is a flow chart illustrating an exemplary method of determining parameters of an exercise routine in accordance with the present disclosure.

Moving now to FIG. 5, illustrated is a flow diagram of a routine 500 for using a weight pin 110 and tags 118 in accordance with the present disclosure. In this embodiment, at least a portion of the routine 500 can be performed by the circuitry 224 to record and/or communicate information relating to an exercise program of a user 106.

Beginning at step 501, the user 106 may have a user tag 130 that is worn or placed on a specific area of the machine 101, the user tag 130 including information specific to the user (e.g., name, age, weight, etc.). The information on the user tag 130 can be read by the reader 120 of the machine 101, and a time stamp can be associated to the user information, the time stamp corresponding to the time period during which the user 106 was at the machine 101. The information (user ID, machine and time stamp) then may be forwarded to the server 122 for later association to data collected by the weight pin 110. Next at step 502, motion data from the weight pin 110, such as acceleration data from the accelerometer 238, is monitored, for example, by the processor 234. At block 504 the data is analyzed to determine if it is indicative of motion of the weight pin 110. If motion of the weight pin 110 is detected then the motion data is processed (blocks 510-522). On the other hand, if motion of the weight pin 110 is not detected over a prescribed time period, the transceiver 242 of the weight pin 110 is disabled to conserve battery power (blocks 506-508). In analyzing the motion data, various filtering techniques may be applied to the data to ensure the data is representative of actual motion, as is conventional.

At block 504, if it is determined that the weight pin 110 is not undergoing motion, then the method moves to block 506 where it is determined if a timer (e.g., a timer generated by the clock 240) has elapsed. If the timer has not elapsed, the method moves back to block 502 and repeats, while if the timer has elapsed then the method moves to block 508 where the transceiver 242 is disabled to conserve battery power. The method then moves back to block 502 and repeats.

Moving back to block 504, if it is determined that the weight pin 110 is undergoing motion, the method moves to block 510 where the timer is reset. Resetting the timer ensures that the transceiver 242 will be enabled for at least a prescribed time period after motion has last been detected, thereby enabling communications between the weight pin 110 and other devices, such as server 122.

Next at block 512 it is determined if the motion of the weight pin 110 corresponds to rotational motion, thus signifying a particular configuration of the weight machine. If the motion does correspond to rotational motion, then at block 514 the direction and/or degree of rotation of the weight pin 110 is determined. For example, along with the direction of rotation (e.g., left or right) of the weight pin 110 it also may be determined if the weight pin 110 is rotated a quarter turn, half turn, three-quarter turn, etc. Upon determining the direction and/or degree of rotation, the method moves to block 516. Moving back to block 512, if the motion data does not corresponding to rotation of the weight pin 110, the method bypasses block 514 and moves to block 516.

At block 516 the circuitry 220 of the weight pin 110 reads the data from the tag 118, for example, via NFC, optical reader, etc. The data read by the circuitry 220 from the tag 118 includes information indicative of the particular weight plate 102 that has been selected by the user 106, and optionally information concerning the weight machine 100 (e.g., the type of machine, etc.). For example, if the user selects the plate 102 corresponding to 100 pounds the data on the tag and read by the weight pint 110 would indicate that the user is lifting 100 pounds, while if the user selects the plate 102 corresponding to 50 pounds the data on the tag and read by the weight pin 110 would indicate the user is lifting 50 pounds. The tag may also include information that indicates the selected weights corresponding to a bench press machine.

Next at block 518 the exercise repetitions performed by the user are counted, for example, based on the acceleration/motion data. For example, each time the weight plate 102 is raised and lowered by the user 106 the accelerometer 238 provides data indicative of positive (negative) acceleration along a first axis, and then negative (positive) acceleration along the same axis. The combination of these two events can be interpreted as a single repetition, and the processor 234 can increment a counter corresponding to the total number of repetitions. The processor 234 can also determine the velocity of the weight plates 102 during each raise and lower cycle, and the duration of the lifting cycle.

At block 520, the degree of rotation of the weight pin 110, the tag data, the repetitions, velocity, duration, and any other information of interest, is stored in memory 236 of the weight pin 110 along with a time stamp. The time stamp can be used, for example, by the server 122 to correlate the data from the weight pin 110 with a particular user 106. For example, as noted at block 501 the time the user 106 was at the machine may be determined from the user tag 130 as read by the reader 120 of the machine 101. The server 122 can correlate the time the user 106 was at the machine 101 with the time stamps of the data provided by the weight pin 110 and associate the two with each other. In this manner, the user 106 can easily retrieve the data for his/her exercise routine.

At block 522, the transceiver 242 is enabled and the data stored in memory 236 may be communicated to an external device, e.g., to the server 122, for storage and/or further processing. The method then moves back to block 502 and repeats.

Accordingly, the weight pin 110 and method in accordance with the present disclosure enable details of a workout routine to be automatically recorded, without mechanically impacting the weight machine. Moreover, the weight pin does not require periodic recalibration, is significantly less costly than prior art load cell weight pins, and provides an exact measurement of the selected weight.

Aspects of the present disclosure may be practiced in a variety of computing environments. For example, a distributed computing environment with a web interface includes one or more user computers, each of which includes a browser program module that permits the computer to access and exchange data with the Internet, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives). User computers may include other program modules such as an operating system, one or more application programs (e.g., word processing or spread sheet applications), and the like. User computers include wireless computers, such as mobile phones, personal digital assistants (PDA's), palm-top computers, etc., which communicate with the Internet via a wireless link. The computers may be general-purpose devices that can be programmed to run various types of applications, or they may be single-purpose devices optimized or limited to a particular function or class of functions.

Such computing environments can also include at least one server computer coupled to the Internet or World Wide Web which performs much or all of the functions for receiving, routing and storing of electronic messages, such as web pages, audio signals and electronic images. While the Internet is discussed here, a private network, such as an intranet may likewise be used herein. The network may have a client-server architecture, in which a computer is dedicated to serving other client computers, or it may have other architectures such as a peer-to-peer, in which one or more computers serve simultaneously as servers and clients. A database or databases, coupled to the server computer(s), stores much of the web pages and content exchanged between the user computers. The server computer(s), including the database(s), may employ security measures to inhibit malicious attacks on the system and to preserve integrity of the messages and data stored therein (e.g., firewall systems, secure socket layers (SSL) password protection schemes, encryption, and the like).

The server computer may include a server engine, a web page management component, a content management component and a database management component. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as animation graphics and audio signals.

One skilled in the relevant art will appreciate that the concepts of the present disclosure can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

From the foregoing, it will be appreciated that specific embodiments of the present disclosure have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

What is claimed is:

1. A weight pin for use with a stacked weight exercise machine, the weight pin comprising:
    a handle portion;
    a shaft portion extending outwardly from the handle portion, wherein the shaft portion is configured to be removably positioned adjacent to one or more weights of the exercise machine to selectively engage the one or more weights during use of the exercise machine;

interrogation circuitry arranged relative to the handle portion, the interrogation circuitry configured to read information from the adjacent one or more weights; and an accelerometer configured to respond to movement of the one or more weights during use of the exercise machine;

wherein the interrogation circuitry comprises a processor to process information read from the adjacent one or more weights, and memory operably connected to the processor to record information from the processor;

wherein the memory includes computer-readable instructions that cause the processor to: determine rotational movement of the weight pin about an axis of the shaft portion based at least in part on the information received from the accelerometer; and determine a configuration of the exercise machine based on the rotational movement rotational movement; and wherein the determined rotational movement of the weight pin is used to identify a type of exercise being performed on the exercise machine.

2. The weight pin according to claim 1, wherein the interrogation circuitry comprises a near field communication device.

3. The weight pin according to claim 1, wherein the interrogation circuitry comprises a bar code reader.

4. The weight pin according to claim 1, wherein the computer-readable instructions cause the processor to determine a number of repetitions associated with the use of the exercise machine based at least in part on the information received from the accelerometer.

5. The weight pin according to claim 1, wherein the computer-readable instructions cause the processor to determine an exercise weight associated with the use of the exercise machine based at least in part on the information received from the adjacent one or more weights.

6. The weight pin according to claim 1, wherein the interrogation circuitry further includes a transceiver for communicating information associated with at least one of the exercise machine or the data collected by the weight pin to another device.

7. An exercise system, comprising:
the weight pin according to claim 1;
a support member;
a plurality of stacked weights selectively engagable to the support member via the weight pin; and
a plurality of tags attached to respective ones of the plurality of weights, each tag of the plurality of tags including information unique to the respective weight.

8. The exercise system according to claim 7, further comprising the exercise machine, wherein the exercise machine includes the support member movably extending through the one or more weights, wherein the support member includes at least one through-hole configured to receive the shaft portion of the weight pin to releasably couple the one or more weights to the support member during use of the exercise machine.

9. The exercise system according to claim 7, further comprising a server communicatively couplable to the weight pin, wherein subsequent to reading information from the adjacent one or more weights the weight pin transmits the information to the server.

10. A method for obtaining information related to physical performance on an exercise machine, the method comprising: using a weight pin for selecting one or more weights to be lifted to read information on the one or more weights during use of the exercise machine, detecting rotational movement of the weight pin, determining a configuration of the exercise machine based on the detected rotational movement, and identifying a type of exercise being performed on the exercise machine based on the detected rotational movement.

11. The method according to claim 10, further comprising removably positioning at least one portion of the weight pin adjacent to the one or more weights of the exercise machine, and supporting at least a portion of the one or more weights with the weight pin during use of the exercise machine.

12. The method according to claim 11, wherein removably positioning the at least one portion of the weight pin includes removably inserting the at least one portion of the weight pin beneath the one or more weights to releasably couple the one or more weights to a support member of the exercise machine during use of the exercise machine.

13. The method according to claim 10, further comprising recording information related to an acceleration of the one or more weights during use of the exercise machine, and downloading information from the weight pin after use of the exercise machine.

* * * * *